(12) United States Patent
Kwon et al.

(10) Patent No.: US 7,983,377 B2
(45) Date of Patent: Jul. 19, 2011

(54) EMERGENCY CORE COOLING SYSTEM HAVING CORE BARREL INJECTION EXTENSION DUCTS

(75) Inventors: Tae-Soon Kwon, Seo-gu (KR); Chul-Hwa Song, Seo-gu (KR); Won-Pil Baek, Yuseong-gu (KR)

(73) Assignees: Korea Atomic Energy Research Institute, Daejon (KR); Korea Hydro and Nuclear Power Co., Ltd., Seoul (KR)

( * ) Notice: Subject to any disclaimer, the term of this patent is extended or adjusted under 35 U.S.C. 154(b) by 645 days.

(21) Appl. No.: 12/123,566

(22) Filed: May 20, 2008

(65) Prior Publication Data
US 2009/0232267 A1     Sep. 17, 2009

(30) Foreign Application Priority Data

Mar. 17, 2008  (KR) .................. 10-2008-0024306

(51) Int. Cl.
*G21C 1/24*     (2006.01)
*G21C 15/00*   (2006.01)
*G21C 9/00*     (2006.01)
(52) U.S. Cl. .................. 376/352; 376/282; 376/395
(58) Field of Classification Search .................. 376/395, 376/282, 352
See application file for complete search history.

(56) References Cited

U.S. PATENT DOCUMENTS

| 5,135,708 | A | 8/1992 | Carlton et al. |
| 5,377,242 | A | 12/1994 | Carlton et al. |
| 2008/0279326 | A1 * | 11/2008 | Gilmore et al. ............... 376/395 |

FOREIGN PATENT DOCUMENTS

| KR | 10-2000-0074521 | 12/2000 |
| KR | 20000074521 | * 12/2000 |
| KR | 10-2003-0064634 | 8/2003 |

OTHER PUBLICATIONS

Kwon, T.S. et al "Effect of the yaw injection angle on the ECC bypass in comparison with the horizontal DVI." Nuclear Engineering and Design 225 (2003) pp. 295-304.

* cited by examiner

*Primary Examiner* — Rick Palabrica
*Assistant Examiner* — Erin M Leach
(74) *Attorney, Agent, or Firm* — Merchant & Gould P.C.

(57) ABSTRACT

An emergency core cooling system directly injects emergency core cooling water, which is supplied from a high-pressure safety injection pump or a safety injection tank for a pressurized light water reactor, into a reactor vessel downcomer. A pipe connector is completely removed from between each direct vessel injection nozzle and each injection extension duct installed on an outer surface of the core barrel, which are opposite to each other. An emergency core cooling water intake port, through which the water is injected from each direct vessel injection nozzle, is formed on the surface of each injection extension duct facing an axis of each direct vessel injection nozzle. Thereby, a structure in which a jet of the emergency core cooling water flows into the injection extension ducts is adopted in a hydraulic connection fashion.

5 Claims, 11 Drawing Sheets

PRIOR ART

PRIOR ART

PRIOR ART

EMERGENCY CORE COOLING SYSTEM HAVING CORE BARREL INJECTION EXTENSION DUCTS

BACKGROUND OF THE INVENTION

1. Field of the Invention

The present invention relates generally to an emergency core cooling system (ECCS) for a pressurized light water reactor, which directly injects emergency core cooling water, which is supplied from a high-pressure safety injection pump or a safety injection tank, into the downcomer of a reactor vessel, and, more particularly, to a downcomer injection extension duct technology for interrupting an emergency core cooling water direct bypass discharge phenomenon in which emergency core cooling water is guided by a strong cross-flow of the downcomer in the event of a large break loss of coolant accident (LBLOCA), and is then discharged out of the reactor.

2. Description of the Related Art

A pressurized light water reactor can encounter unexpected safety problems even though it has been designed in consideration of a sufficient safety margin. If sufficient emergency core cooling water is not supplied when a safety problem in which a large quantity of cooling water leaks occurs, a core can overheat, resulting in damage to the reactor. In order to cool the core when the cooling water leaks, the pressurized light water reactor is equipped with a high-pressure safety injection pump and a safety injection tank such that the emergency core cooling water is exhausted externally. The supply of the emergency core cooling water is divided into two types according to the position of the injection nozzle end. Among the two types, one is a cold leg injection type, in which the injection nozzle is located at a cold leg, and the other is a direct vessel injection type, in which the injection nozzle is located at a reactor vessel.

The cold leg injection type means that the emergency core cooling water is supplied to a reactor system through an injection line, which is connected to a cold leg corresponding to a pipe supplying cold water from the circulating pump of a reactor coolant circulatory system into the reactor vessel, and has a drawback in that, when the emergency core cooling water is supplied to a broken cold leg, the emergency core cooling water completely leaks out of the broken cold leg, and thus the reactor core cooling effect cannot be expected. As such, the direct vessel injection type is currently configured to include a direct vessel injection (DVI) nozzle, which supplies the emergency core cooling water to the reactor vessel, and to directly supply the emergency core cooling water to a downcomer between the reactor vessel and a core support barrel.

However, the direct vessel injection type has a problem in that there is an increase in the emergency core cooling water direct bypass phenomenon, in which, when the cold leg is broken, the emergency core cooling water is headed to the broken cold leg by strong cross-flow of the downcomer, and is discharged out of the reactor vessel. As illustrated in FIGS. 1A through 1D, a conventional technology for preventing the emergency core cooling water direct bypass phenomenon is designed such that an injection extension duct 110 or 110' is installed on the outer surface of a core barrel 100 of the downcomer 140 of FIG. 1A or on a baffle region in a core barrel 100 of FIG. 1B, and such that the injection extension duct 110 or 110' is connected with the DVI nozzle 120 across the downcomer 140 using a pipe 130. Further, the conventional technology is designed such that an injection extension duct 210 is installed on the outer surface of a core barrel 200 of the downcomer 240 of FIG. 1C, and such that the injection extension duct 210 is connected with the DVI nozzle 220 across the downcomer 240 using projection nozzles 230 and 230'.

As disclosed in U.S. Pat. Nos. 5,377,242 (James D. Carlton, et al.) and 5,135,708 (James D. Carlton, et al.), illustrated in FIGS. 1A and 1B respectively, the conventional method of connecting the DVI nozzle 120 with the injection extension duct 110 or 110' in the downcomer 140 using the pipe 130 entails difficulty in the installation of the connecting portion because the gap in the downcomer 140 is narrow. When the reactor vessel is assembled with the core barrel, interference between the projections occurs. Further, according to this prior art, when a large cold leg 150 is broken, the emergency core cooling water can be effectively injected up to a lower portion or a core inlet of the downcomer 140. However, when a DVI line itself is broken, an outlet of the injection extension duct 110 or 110' functions as an inlet of a break flow due to a siphon effect, and the level of the cooling water in the reactor vessel is lowered by the length of the injection extension duct 110 or 110', so that the core cladding temperature is abnormally increased. This leads to a problem of noncompliance with safety regulations.

As illustrated in FIG. 1C, another conventional technology similar to the aforementioned technology is adapted to directly connect the DVI nozzle 220 and the injection extension duct 210 in the downcomer 240 using a pipe, to position the protruding nozzles 230 and 230' so as to be opposite to each other, and form a slight gap (Korean Patent Application Publication No. 10-2000-0074521). However, this conventional technology also has a problem in that, when the reactor vessel is assembled with the core barrel 200, interference between the nozzles 230 and 230' protruding to the downcomer 240 occurs, thus making an assembly difficult, and thus a hole, which is used for a periodical withdrawal checkup of a neutron monitoring capsule installed at a lower portion of the reactor vessel, overlaps with the protruding nozzles, so that work becomes impossible. Further, when the DVI pipe line is broken, the gap between the upper connection nozzles of the injection extension duct 210 is narrow, and thus an inlet-outlet reverse phenomenon, in which the lowest outlet of the injection extension duct 210, located at the lowest position of the injection extension duct 210, functions as an inlet, is caused, although the quantity of intake of the break flow is not much. As such, there is a problem in that the level of the cooling water in the reactor vessel is significantly lowered down to the lowest outlet of the injection extension duct 210, and then the lowest outlet of the injection extension duct 210 functions as an inlet.

There is a simpler technology in which an outlet of the DVI nozzle is vertically positioned at a right angle using an elbow 320 (Korean Patent Application Publication No. 10-2003-0064634). However, since the space occupied by the elbow 320 is similar to the gap in the downcomer 330, the reactor vessel 300 cannot be assembled with the core barrel 310. As a result of performing an emergency core cooling water bypass test, it was found that this simple vertical injection has little thermal hydraulic effect, because the direct bypass rate of the emergency core cooling water is very high (NED Vol. 225, "Effect of the yaw injection angle on the ECC bypass in comparison with the horizontal injection," T. S. Kwon et al., 2003).

According to the aforementioned conventional technology, the DVI line for the emergency core cooling water is broken, and thus the lowest outlet of the injection extension duct functions as an inlet for the break flow. In this case, the level of the cooling water in the reactor vessel is gradually lowered to reach a position equal to or lower than the lowest outlet of the injection extension duct, which is located at the lowest position of the injection extension duct. When the level of the cooling water is lowered, the reactor core is exposed. This has a lethal result when the reactor core is cooled.

As described above, the conventional common technical problem is mostly attributable to a connection structure in which the DVI nozzle and the injection extension duct are connected to each other in the downcomer. Thus, in order to improve the assemblability between the reactor vessel and the core barrel, avoid an interference between the structures within a checkup work area during the operation, interrupt the inlet-outlet reverse phenomenon of an injection extension duct when the DVI line is broken, and avoid interference between the withdrawal inlet of the neutron monitoring capsule and the injection extension duct or the protruding nozzles, the concept of an injection extension duct having a new structure is required.

An emergency core cooling water direct vessel injection system, which directly injects emergency core cooling water into the downcomer of a reactor vessel in a pressurized light water reactor complies with the following design requirements.

First, the emergency core cooling water direct vessel injection system should be able to supply a larger quantity of emergency core cooling water to a core inlet through a lower portion of the downcomer by interrupting a phenomenon in which the emergency core cooling water is bypassed and discharged by a high-speed steam cross flow in the downcomer occurring in the event of a large break loss of coolant accident (LBLOCA).

Second, a phenomenon in which the level of the cooling water in the reactor vessel is significantly reduced should not occur because an emergency core cooling water outlet of the lowest position of the injection extension duct functions as an inlet for a break flow so as to be able to be applied when the pipe of a direct vessel injection system is broken.

Third, due to the injection extension duct installed in the downcomer, the cross flow resistance should not be excessively increased, and the flow induced vibration should not be excessively increased.

Fourth, a connector of the injection extension duct and the direct vessel injection nozzle should not cause an interference when the reactor vessel is assembled with the core barrel in the downcomer or an interference with the withdrawal hole of a neutron monitoring capsule. Thereby, a practical application is possible, and the design can be certified, and continuous checkup during an operation of the reactor is possible.

SUMMARY OF THE INVENTION

Accordingly, the present invention has been made by keeping in mind the above problems occurring in the related art. The present invention is directed to provide an emergency core cooling system having an injection extension duct for a pressurized light water reactor, in which the injection extension duct can be used in the event of a large break loss of coolant accident (LBLOCA) or a breakage accident of a direct vessel injection system pipe by interrupting the phenomenon in which emergency core cooling water is bypassed and discharged by a high-speed steam cross flow in a downcomer when a cold leg is broken, and preventing an inlet-outlet reverse phenomenon of the injection extension duct, thereby not interfering with the reactor assembly work and the periodical checkup work of the neutron monitoring capsule and reducing the cross flow resistance.

According to one aspect of the present invention, there is provided an emergency core cooling system having core barrel injection extension ducts, which directly injects emergency core cooling water, which is supplied from a high-pressure safety injection pump or a safety injection tank for a pressurized light water reactor, into a reactor vessel downcomer, and in which the core barrel injection extension ducts interrupt an emergency core cooling water direct bypass discharge phenomenon, in which emergency core cooling water is controlled by a strong cross-flow of the downcomer in the event of a large break loss of coolant accident (LBLOCA) and is thereby discharged out of the reactor.

According to the present invention, both a reactor assembly interference problem and an inlet-outlet reverse phenomenon occurring when any pipe of a direct vessel injection system is broken, which occurs in the prior art, are prevented. Thus, a concept of an emergency core cooling water injection extension duct of a downcomer having a new structure that is capable of preventing the level of the cooling water from being excessively lowered in the reactor vessel is realized.

In the present invention, without a mechanical connection between the direct vessel injection nozzle and the injection extension duct using a pipe or a protrusion nozzle, the emergency core cooling water inlet and outlet, which are opposite each other, are designed to open in the downcomer. As illustrated in FIG. 2, although the direct vessel injection nozzle is not mechanically connected with the injection extension duct by means of a pipe, an emergency core cooling water intake port, through which the emergency core cooling water is injected from the direct vessel injection nozzle, is formed in the injection extension duct, located on an axis of the direct vessel injection nozzle, and a jet of the emergency core cooling water flows into the injection extension duct in a hydraulic connection fashion.

The speed of the jet formed when the emergency core cooling water, supplied from a high-pressure safety injection pump or a safety injection tank, is injected into the reactor vessel downcomer through the direct vessel injection nozzle is high, and a jet stream capable of flowing across the downcomer between the direct vessel injection nozzle and the injection extension duct is formed by the momentum of the injected emergency core cooling water although the direct vessel injection nozzle is mechanically connected with the injection extension duct using a separate connection pipe or a separate protrusion nozzle. Thus, the direct vessel injection nozzle is hydraulically connected with the injection extension duct. Further, the emergency core cooling water does not yet flow into the injection extension duct, and thus part of the emergency core cooling water flows down into the downcomer, which is then stored in the downcomer of the reactor vessel, and contributes to the cooling of the reactor core.

As a result, in a normal operation state, in which the emergency core cooling water is not injected, the direct vessel injection nozzle and the injection extension duct are open to the downcomer, and are connected by the water jet only when the emergency core cooling water is injected. Due to the connecting structure in the downcomer, interference, occurring when the reactor vessel is assembled with the core barrel, can be avoided. Further, interference between the withdrawal hole of a neutron monitoring capsule, which is attached to the downcomer of the reactor vessel and is periodically withdrawn and checked, and the injection extension duct can be fundamentally prevented.

In the emergency core cooling system having core barrel injection extension ducts as illustrated in FIG. 3, the emergency core cooling water does not form water jets even in the event of an accident in which the direct vessel injection system pipe itself is broken, and thus the hydraulic connection between the direct vessel injection nozzle and the injection extension duct is automatically disconnected. As a result, only the cooling water in the hydraulically disconnected downcomer is discharged out of the reactor vessel through the direct vessel injection nozzle.

Thus, in the prior art, in which the direct vessel injection nozzle and the injection extension duct are mechanically connected by a pipe and a nozzle, the inlet of the cooling water discharged out of the reactor vessel is located at the lowest position of the injection extension duct. However, in the present invention, the outlet of the cooling water is limited to the direct vessel injection nozzle, and thus the height of the inlet is further increased by the length of the injection extension duct compared to the prior art. The configuration in which the height of the inlet is further increased has a structural advantage in that it greatly contributes to preventing the level of the cooling water from being excessively lowered in the reactor vessel.

Further, in the emergency core cooling system having core barrel injection extension ducts as illustrated in FIG. 5, lateral sides of the conventional injection extension duct are inclined as in a well known quadrilateral cross-sectional injection extension duct, so that the cross flow resistance of the downcomer is reduced. When the cross flow resistance against the jet of the cold leg is reduced, the magnitude of a flow vibration disturbance element is reduced.

Thus, the present invention is provided to an emergency core cooling system having injection extension ducts for a pressurized light water reactor, in which the injection extension ducts can be used in the event of both a LBLOCA and a direct vessel injection line break.

According to the present invention, the emergency core cooling system having core barrel injection extension ducts prevents the phenomenon in which the emergency core cooling water is directly bypassed and discharged in the event of the LBLOCA and thus makes a larger quantity of emergency core cooling water contribute to the cooling of the core. Further, in the event of a direct vessel injection pipe line break, the emergency core cooling system having core barrel injection extension ducts has an effect of preventing the level of the cooling water from being lowered in the downcomer due to an inlet-outlet reverse phenomenon at the lowest position of the outlet of the injection extension duct.

Further, because the present invention features inclined lateral faces of the injection extension duct, which has a quadrilateral cross section in the prior art, the cross flow resistance of the downcomer is reduced. As a result of removing the connection structure between the direct vessel injection nozzle installed in the reactor vessel and the injection extension duct installed on the downcomer-side core barrel, the injection extension duct technology of the emergency core cooling water direct vessel injection system, which prevents an interference between the reactor vessel and the core barrel and a withdrawal interference for the neutron monitoring capsule, is provided, so that the safety and the safety regulatory requirements of the reactor can be sufficiently met.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1A:
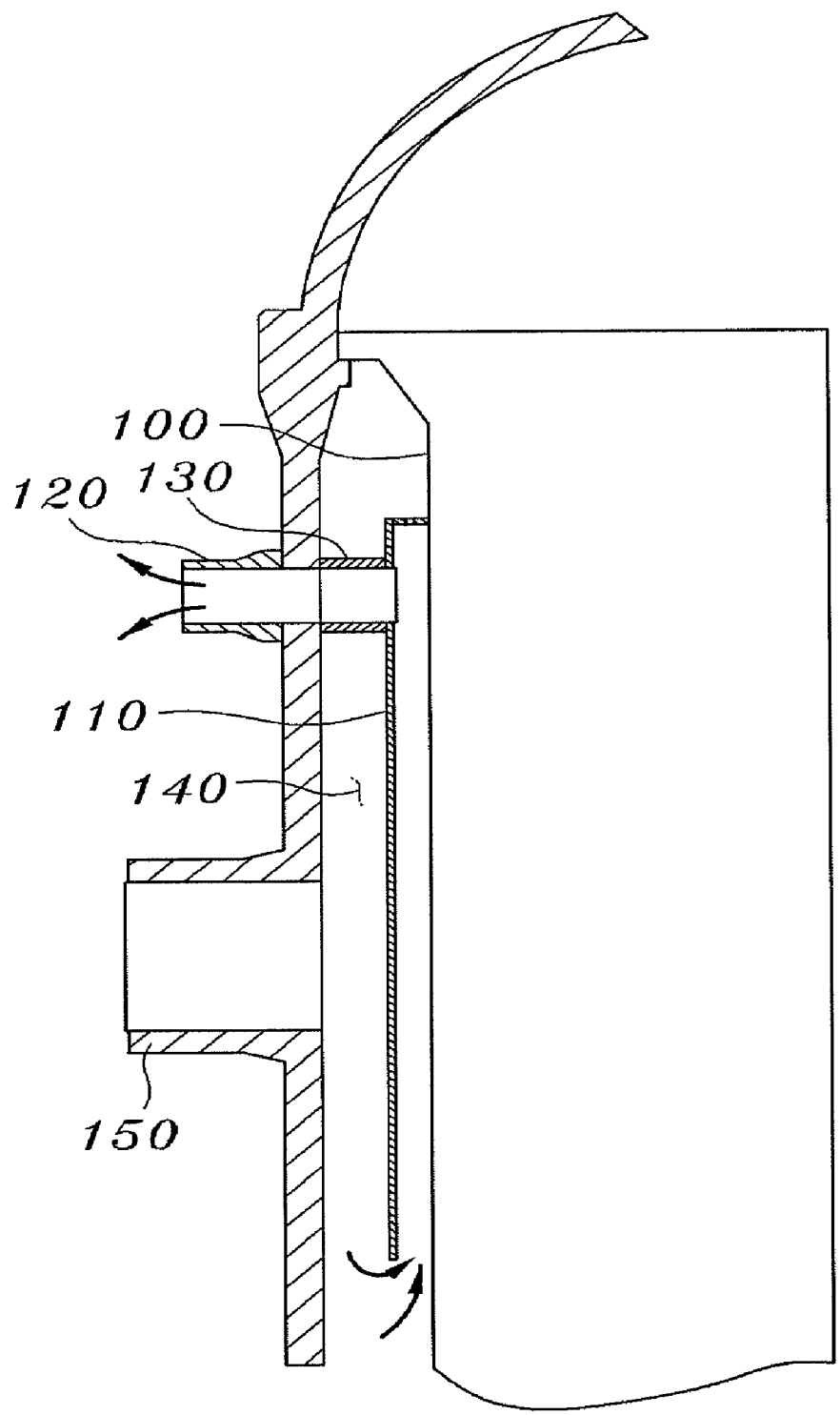
FIGS. 1A through 1D are schematic conceptual views illustrating a conventional emergency core cooling system.
Figure 1B:
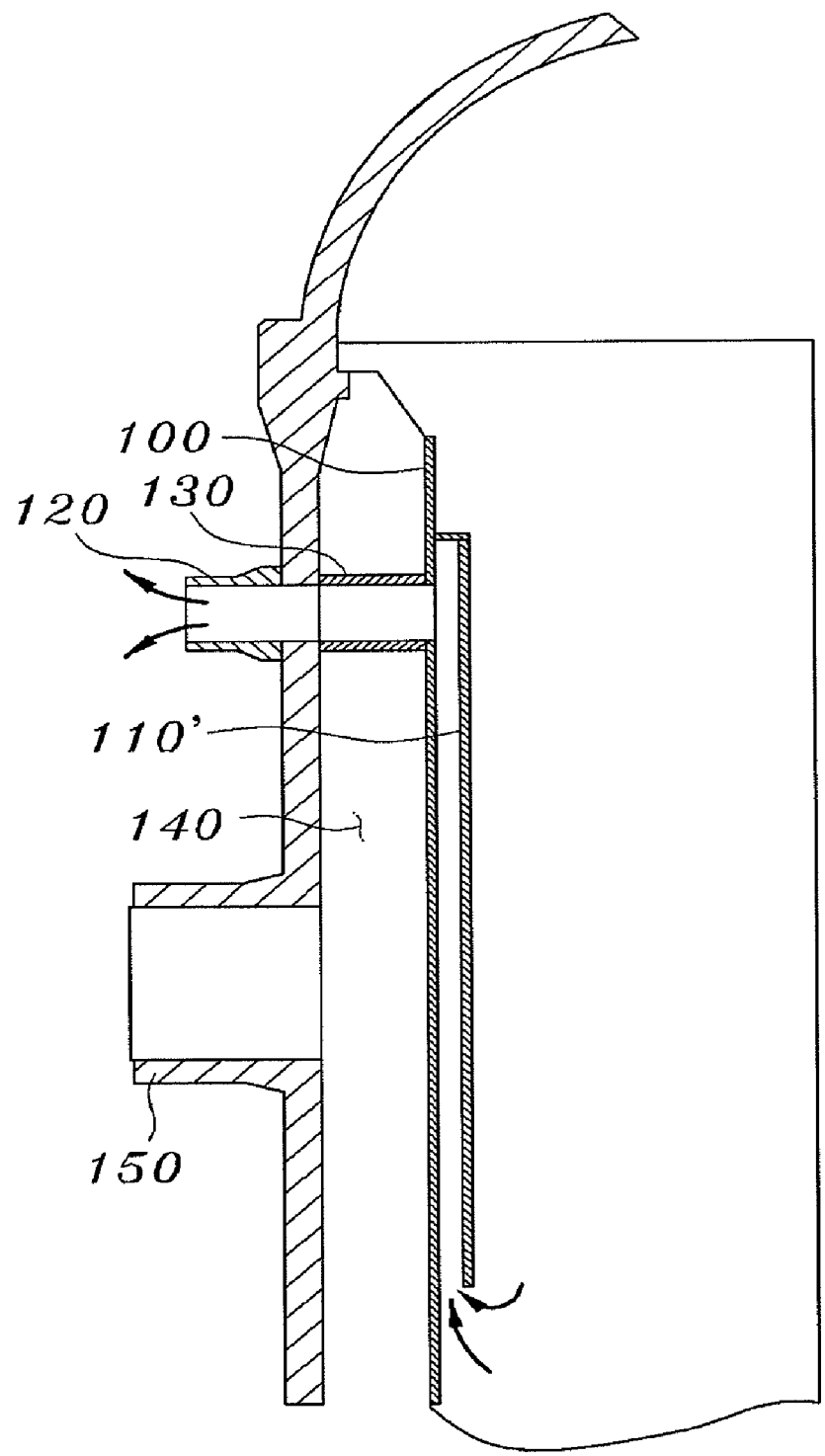
Figure 1C:
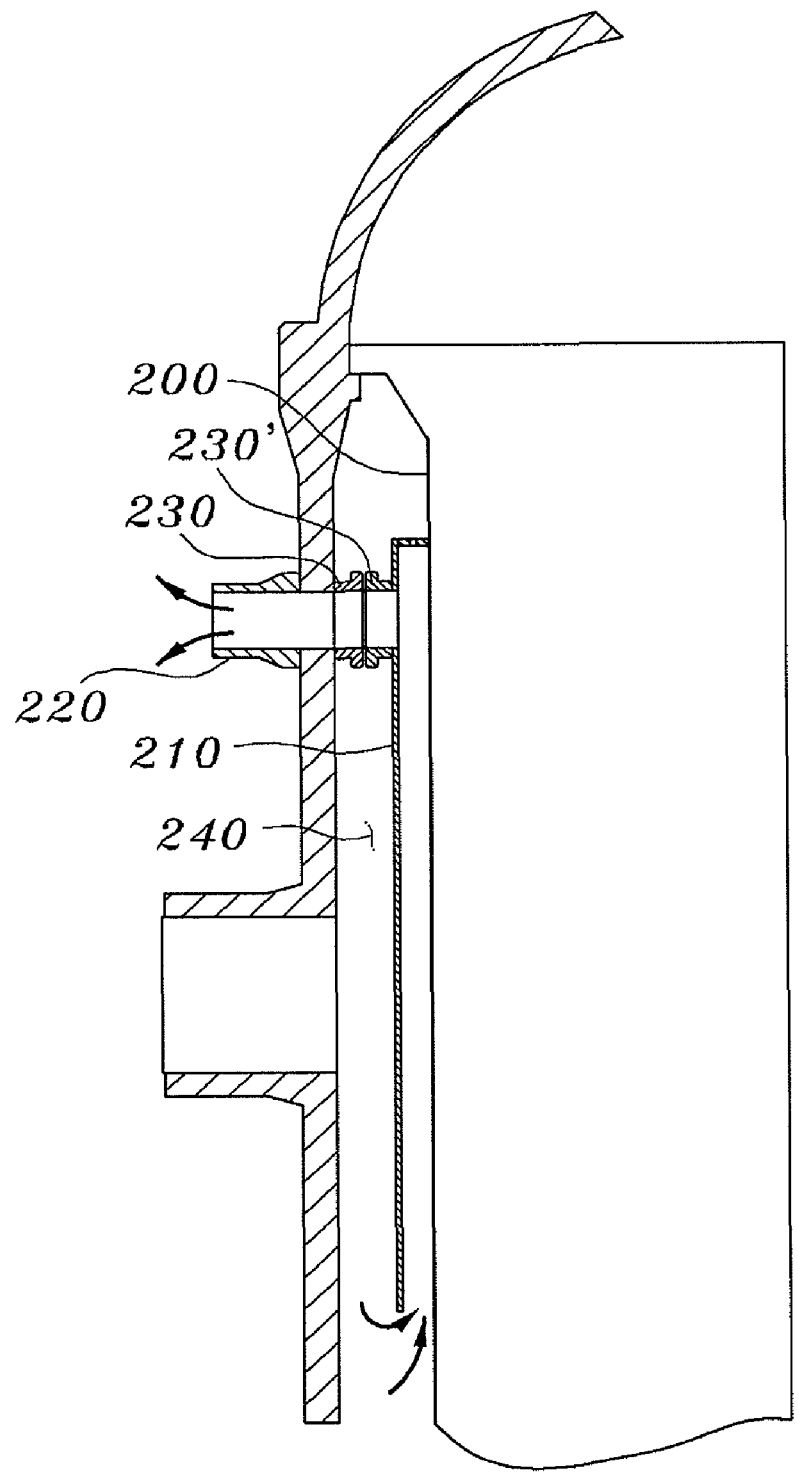
Figure 1D:
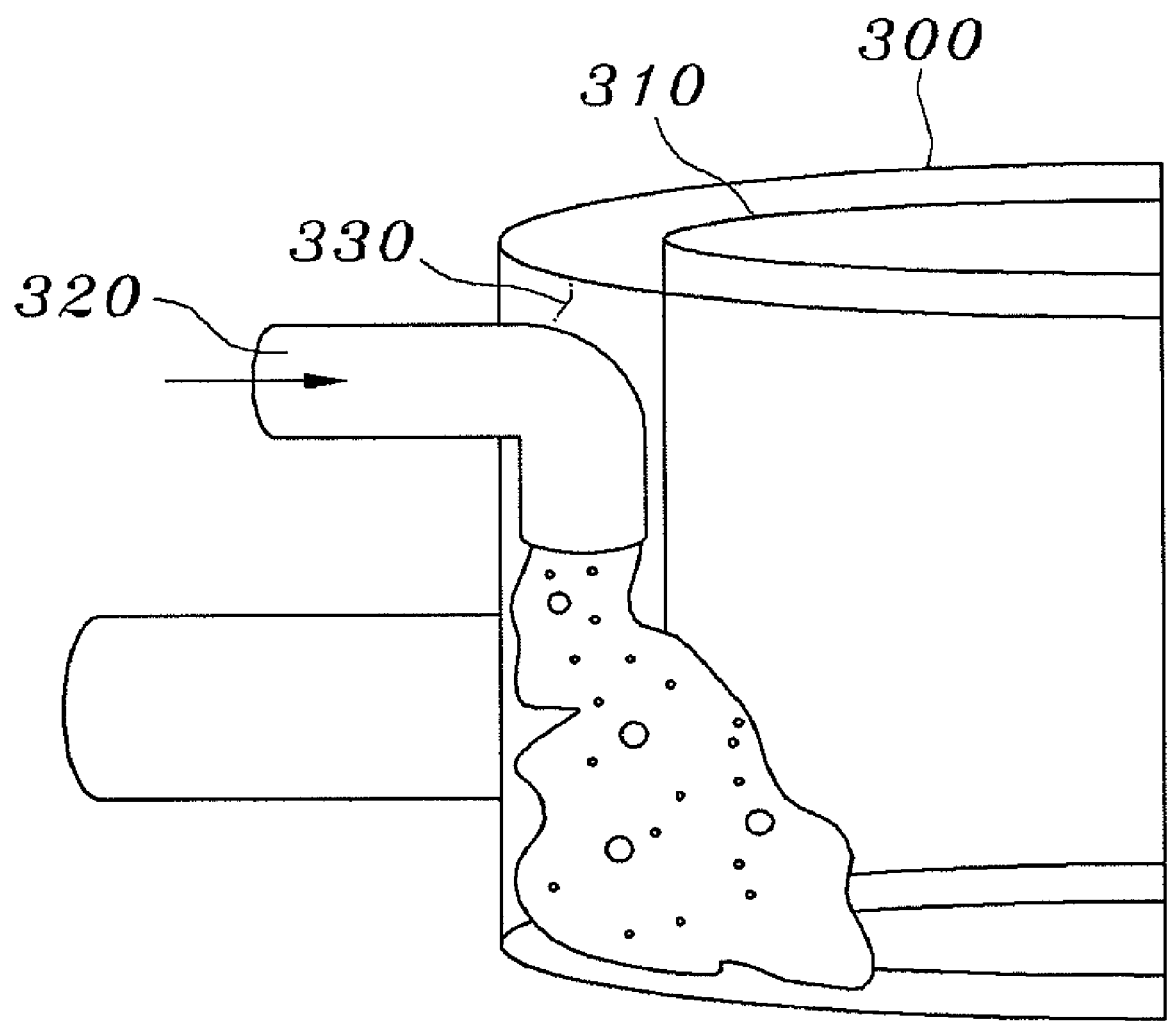
Figure 2:
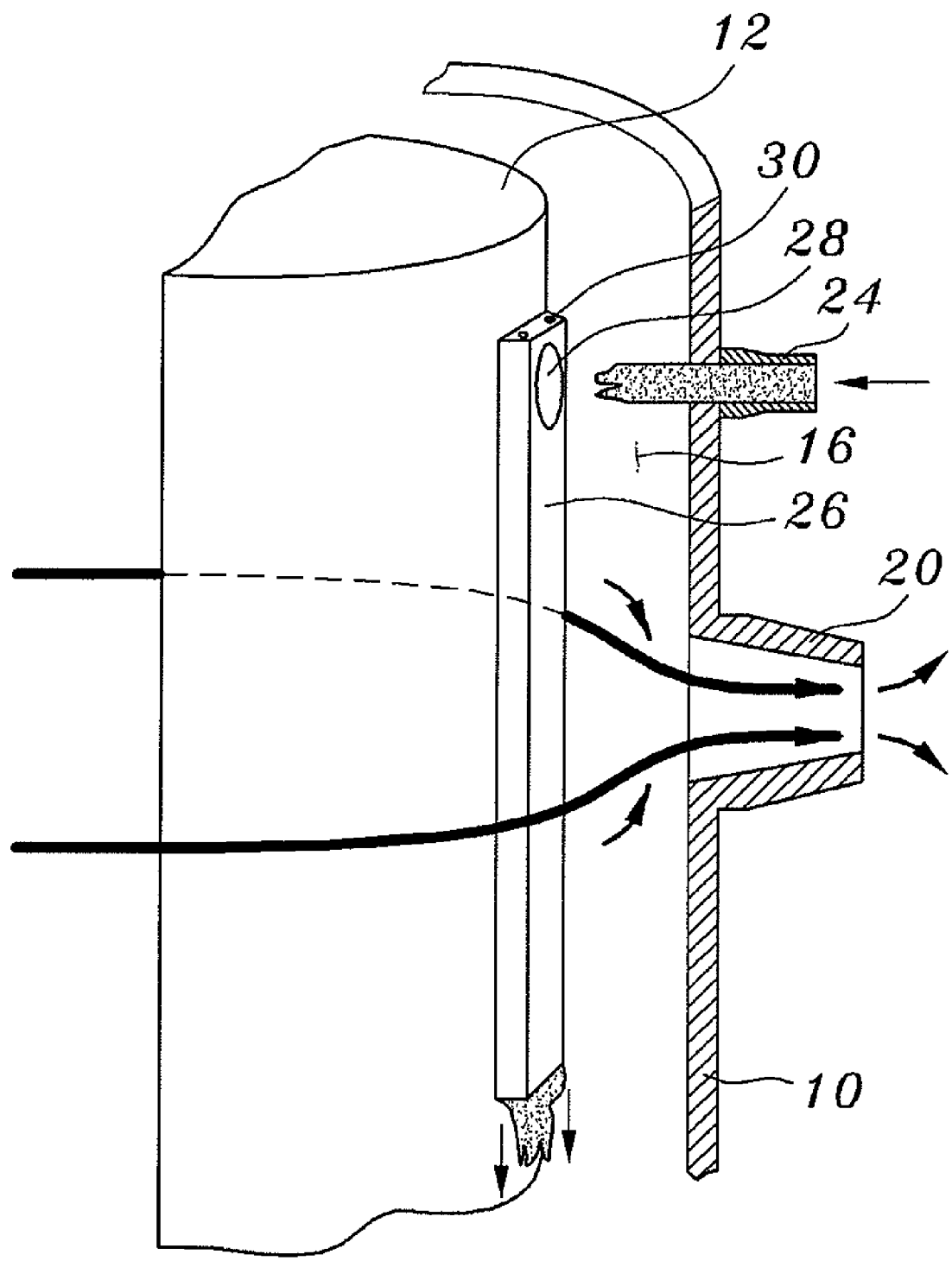
FIG. 2 is a conceptual view illustrating the injection and the direct bypass interruption of emergency core cooling water of an injection extension duct in the event of a large break loss of coolant accident (LBLOCA) in accordance with the present invention.
Figure 3:
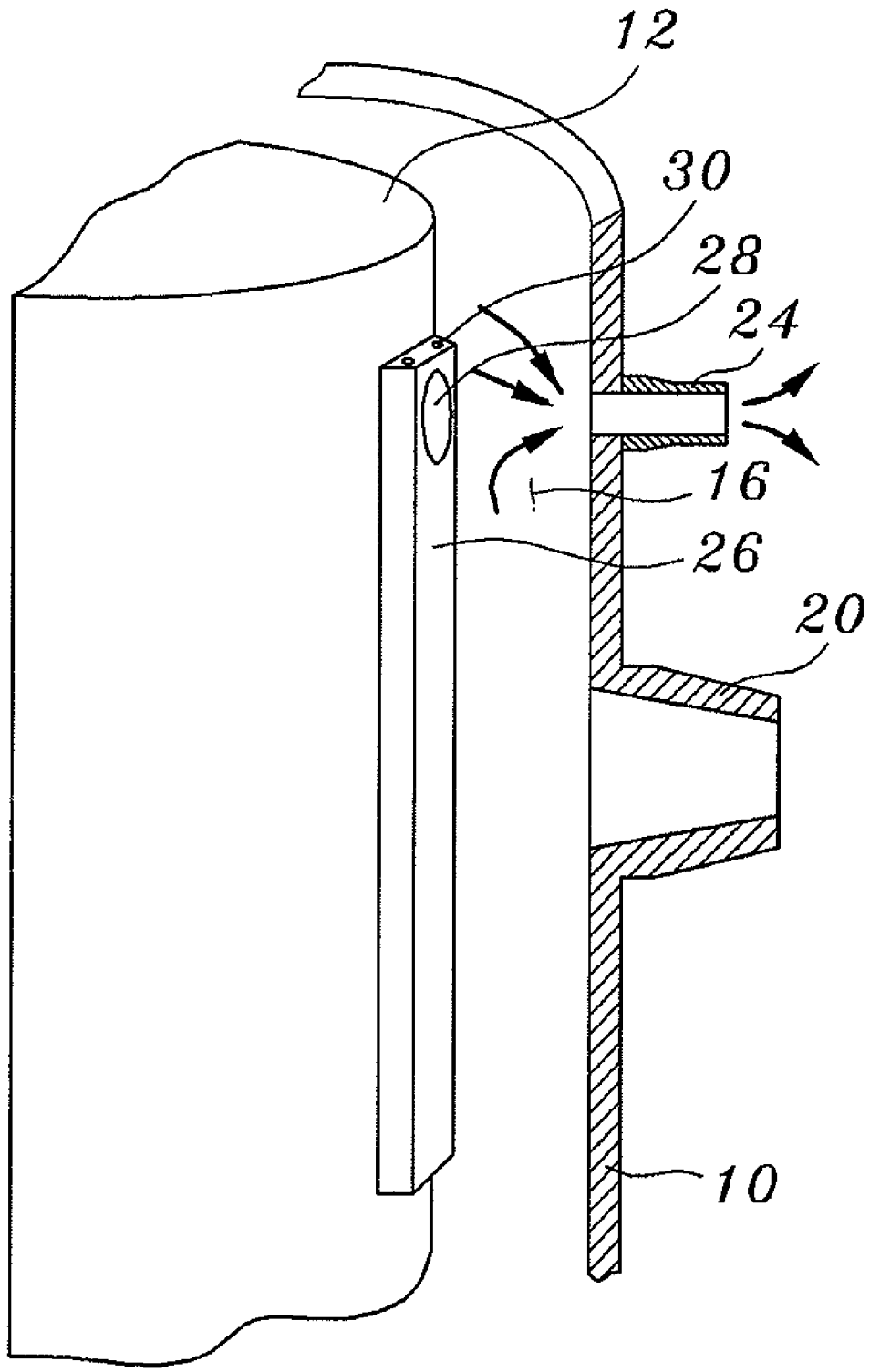
FIG. 3 is a conceptual view illustrating the position of an inlet for a break flow in a reactor vessel in the event of a breakage accident of a direct vessel injection line in accordance with the present invention.

Reference will now be made in greater detail to an exemplary embodiment of the invention, an example of which is illustrated in the accompanying drawings. Wherever possible, the same reference numerals will be used throughout the drawings and a description to refer to the same or like parts. The detailed descriptions of known functions and constructions that might needlessly obscure the subject matter of the present invention will be avoided herein.

Figure 4A:
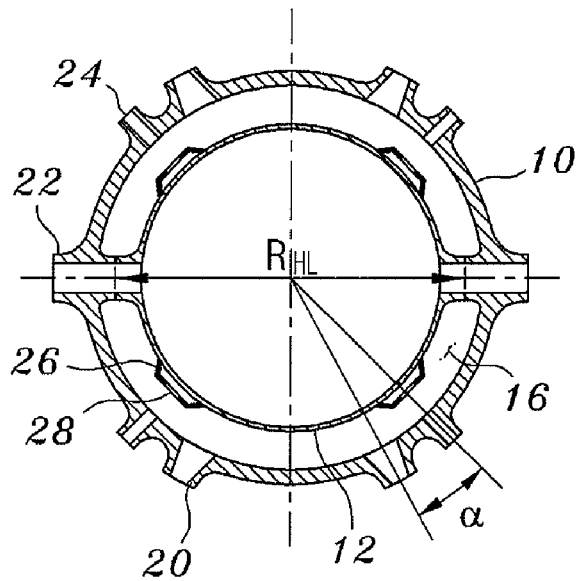
FIGS. 4A and 4B are a top plan view and a longitudinal sectional view illustrating an emergency core cooling system having core barrel injection extension ducts according to a first embodiment of the present invention.
Figure 4A:
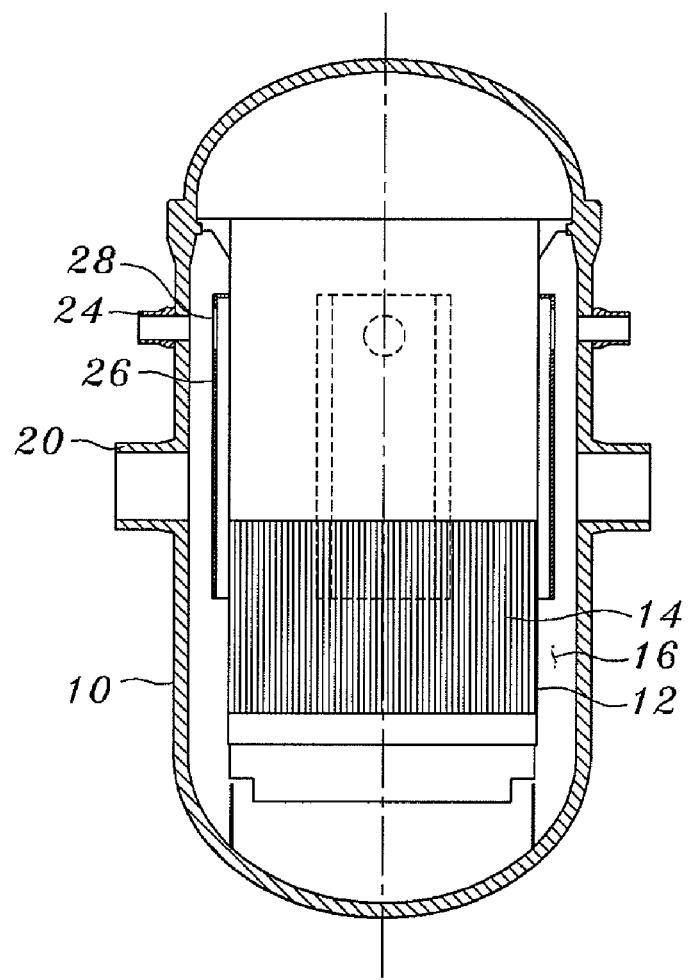
Figure 4B:
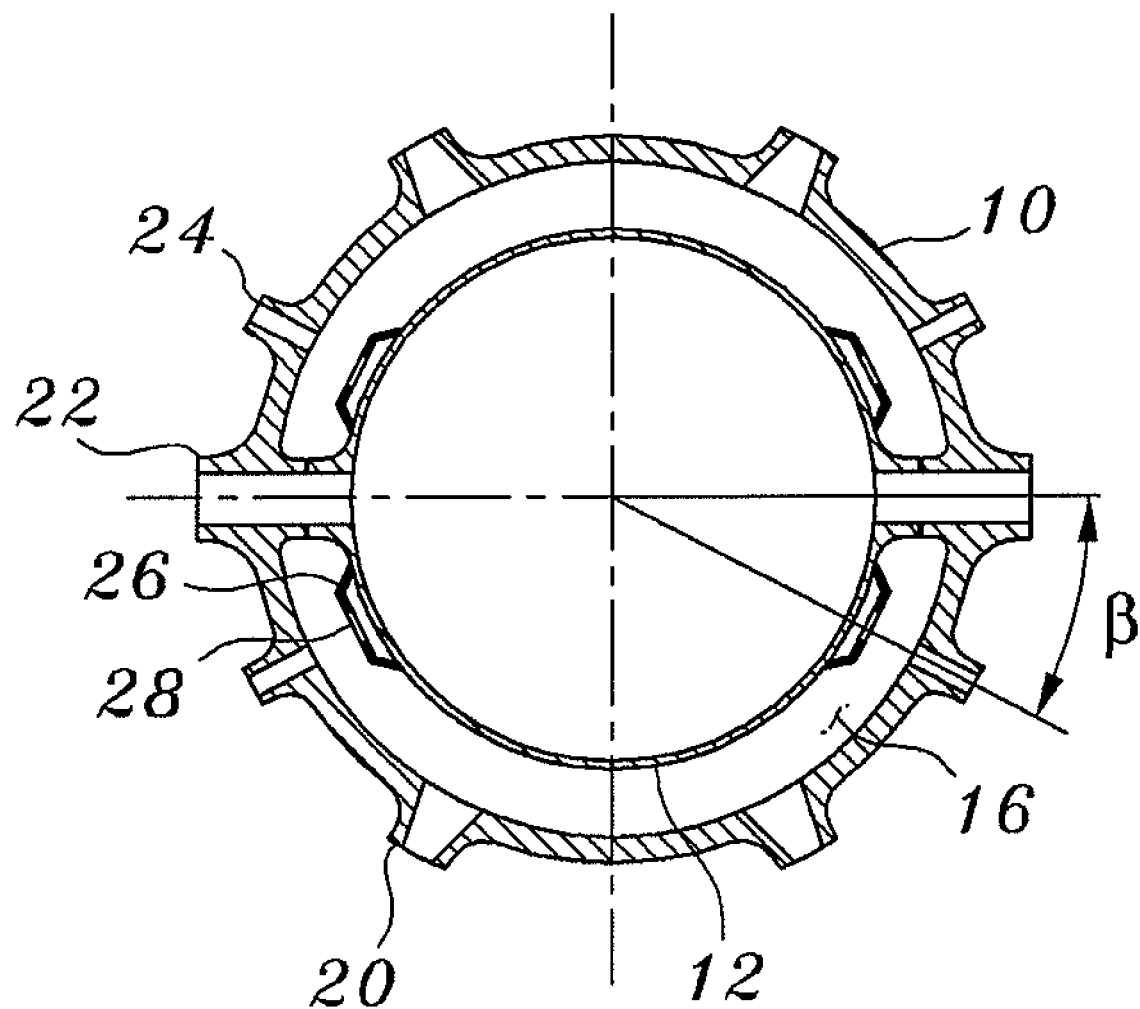

As illustrated in FIG. 4A, an emergency core cooling system having injection extension ducts 26 of a core barrel 12 adopts a system of directly injecting emergency core cooling water into the downcomer 16 of a reactor vessel 10. Here, a pressurized light water reactor generally comprises an outer reactor vessel 10 and a core barrel 12, which has a diameter smaller than that of the reactor vessel 10 and is installed at the center of the reactor vessel 10. Further, a core 14 into which nuclear fuel rods are charged is located in the core barrel 12. The downcomer 16, which has an annular gap space due to the diameter difference between the core barrel 12 and the reactor vessel 10, is formed between the core barrel 12 and the reactor vessel 10. The reactor vessel 10 includes a plurality of cold legs 20, which function as inlets into a reactor cooling water circulatory path in the event of a normal operation, and a plurality of hot legs 22, which function as outlets through which cooling water, heated while sequentially flowing through the cold legs 20, the downcomer 16, and the core 14, flows to a steam generator. In the embodiment of the present invention, as illustrated in FIGS. 4A and 4B, four cold legs 20 and two hot legs 22 are installed.

Figure 6:
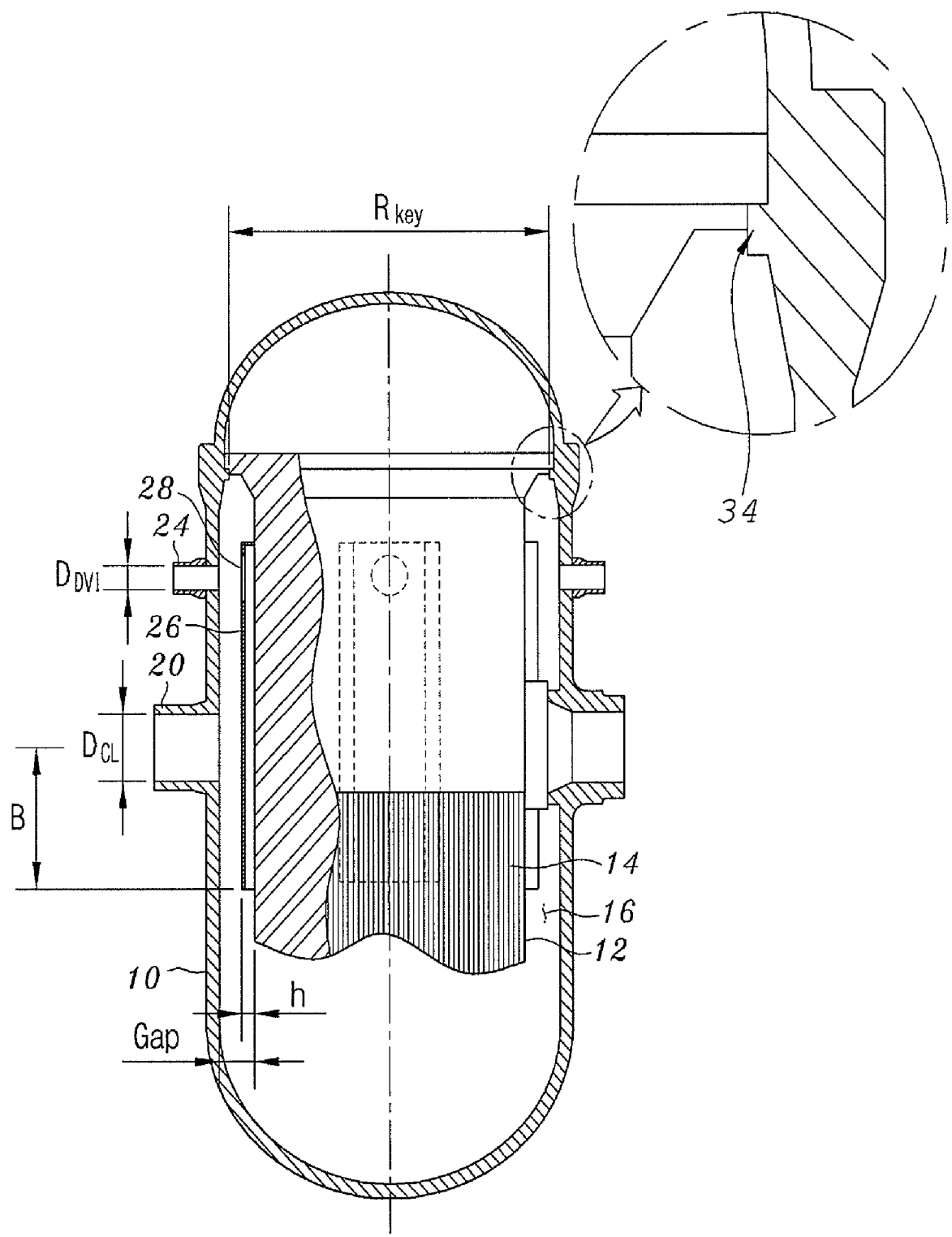
FIG. 6 is a schematic sectional view illustrating the longitudinal cross sectional structure of a pressurized light water reactor having emergency core cooling water injection extension ducts according to a first embodiment of the present invention.

As illustrated in FIGS. 4A and 6, the emergency core cooling system of the pressurized light water reactor according to the present invention includes a plurality of direct vessel injection (DVI) nozzles 24 attached to an upper portion of the reactor vessel 10 constituting a nuclear reactor, and a plurality of injection extension ducts 26 for emergency core cooling water, which are installed on the outer surface of the core barrel 12 so as to face the DVI nozzles 24 with the downcomer 16 in between.

Each injection extension duct 26 includes an emergency core cooling water intake port 28 in an outer surface thereof, wherein the emergency core cooling water intake port 28 passes through the outer surface of the injection extension duct 26, adopting a point intersecting an axis of the DVI nozzle 24 as the central point thereof, and has a diameter about twice the inner diameter $D_{DVI}$ of the DVI nozzle.

According to this configuration of the present invention, no connection structure is installed between the DVI nozzle 24 and the injection extension duct 26 (particularly, the emergency core cooling water intake port). In other words, the DVI nozzle 24 is completely mechanically separated from the injection extension duct 26.

In this manner, with the emergency core cooling system having the core barrel 12 and the injection extension duct 26 according to the present invention, the DVI nozzle 24 is separated from the injection extension duct 26 from a thermal hydraulic aspect when the pressurized light water reactor is normally operated without supply of the emergency core cooling water from the DVI nozzle 24, and no connection structure exists in the downcomer 16 between the DVI nozzle 24 and the injection extension duct 26 in the structural aspect. Thus, no interference occurs when the reactor vessel 10 and the core barrel 12 are assembled and when the neutron monitoring capsule is withdrawn.

However, if a cold leg 20 is completely broken, the water jet speed of the emergency core cooling water injected through the DVI nozzle 24 amounts to about 22 m/sec while the safety injection tank injects the emergency core cooling water, and about 1.6 m/sec while the high-pressure safety injection pump injects the emergency core cooling water. The horizontal inertial force of the emergency core cooling water having such a water jet speed is sufficient for the emergency core cooling water to flow from the DVI nozzle 24 into the emergency core cooling water intake port 28 of the injection extension duct 26 facing the DVI nozzle 24 across the downcomer 16. Thus, the water jet formed while only the emergency core cooling water is injected causes the DVI nozzle 24 to be connected with the injection extension duct 26 in a thermal hydraulic fashion.

The emergency core cooling water injected into the injection extension duct 26 can flow down to the lower portion of the downcomer 16 by means of gravity and flow momentum of the emergency core cooling water. The emergency core cooling water, which flows to the lower portion of the downcomer 16 in the injection extension duct 26 in the event of a large break loss of coolant accident (LBLOCA), is protected from a high-speed cross flow of the downcomer 16 by a wall of the injection extension duct. Further, although not all of the emergency core cooling water has flown into the injection extension duct 26, i.e. although part of the emergency core cooling water flows down to the downcomer 16, the emergency core cooling water that has not flown into the injection extension duct 26 is collected in the downcomer 16 of the reactor vessel 10, and thus helps cool the reactor core.

In the case in which the pipe connected to the DVI nozzle 24 is broken, the emergency core cooling water is not injected into the broken DVI nozzle 24. Thus, the water jet of the emergency core cooling water is not formed. However, since the DVI nozzle 24 is separated from the injection extension duct 26 in a thermal hydraulic fashion, only the cooling water of the downcomer 16 around the DVI nozzle 24 leads to the formation of a break flow.

In other words, when the DVI nozzle 24 is still connected with the injection extension duct 26 in spite of an accident in which the DVI line itself is broken, the lowest outlet of the injection extension duct 26 functions instead as an inlet for the break flow due to a siphon effect, so that the level of the cooling water in the reactor vessel 10 is remarkably lowered by the length of the injection extension duct 26. Thus, the break flow leaks out at a position where the DVI nozzle 24 faces the injection extension duct 26, i.e. at a position where the level of the cooling water is raised by the length of the injection extension duct 26 without the phenomenon in which the lowest outlet of the injection extension duct 26 functions as an inlet.

Accordingly, the level of the cooling water of the reactor vessel 10 in the present invention can be maintained in a manner such that the level of the cooling water of the downcomer is much higher than in the structure in which the DVI nozzle 24 is mechanically connected with the injection extension duct 26 using a pipe, as in the prior art. Thus, the quantity of the cooling water that flows from the downcomer to the core due to the water level difference between the downcomer and the core is increased, so that the reactor core is more effectively cooled.

As illustrated in FIG. 4A, the emergency core cooling system of the present invention is designed on a plane in a manner such that the angle α between the DVI nozzle 24 and the cold leg 20 is smaller than that between the DVI nozzle 24 and the hot leg 22. As also illustrated in FIG. 4A, the emergency core cooling system of the present invention is designed on a plane in a manner such that an angle β between the DVI nozzle 24 and the hot leg 22 is smaller than that between the DVI nozzle 24 and the cold leg 20.

In the present invention, the angle between an axial line, which connects the DVI nozzle 24 and the injection extension duct 26, and the cold leg 20, and the angle between an axial line, which connects the DVI nozzle 24 and the injection extension duct 26, and the hot leg 22 are preferably smaller than the angle α between the DVI nozzle 24 and the cold leg 20 and the angle β between the DVI nozzle 24 and the hot leg 22, respectively. The embodiment of the present invention will be described in conjunction with the case in which an angle between the cold leg 20 and the hot leg 22 is 60°. An area between the angle α of FIG. 4A and the angle β of FIG. 4B is the movement path of an excore monitor that moves outside the reactor vessel in a vertical direction (in upward and downward directions). Thus, in consideration of the width of the injection extension duct 26 and the distance between the injection extension duct 26 and the neighboring hot leg 22, the maximum angle α is preferably less than 15°, and the maximum angle β is preferably less than 35°.

The configuration of the injection extension duct 26 of the present invention will be described in greater detail with reference to FIG. 5A. The lowest outlet of the injection extension duct 26 is open, and the highest cap of the injection extension duct 26 is closed, and it includes at least one air vent 30 such that gas can be discharged when the nuclear reactor is filled with water. The injection extension duct 26 includes the emergency core cooling water intake port 28, which has about twice the inner diameter of the DVI nozzle 24 facing the injection extension duct 26, and is located on the axial line of the DVI nozzle 24.

As illustrated in FIG. 6, the diameter $D_{DUCT}$ of the emergency core cooling water intake port 28 is about twice the inner diameter $D_{DVI}$ of the DVI nozzle 24 in consideration of a deflection of the jet by means of gravity in the case in which the jet of the DVI nozzle 24 has a small spreading and flow rate. Thereby, the emergency core cooling water is more easily introduced into the injection extension duct 26.

Figure 5A:
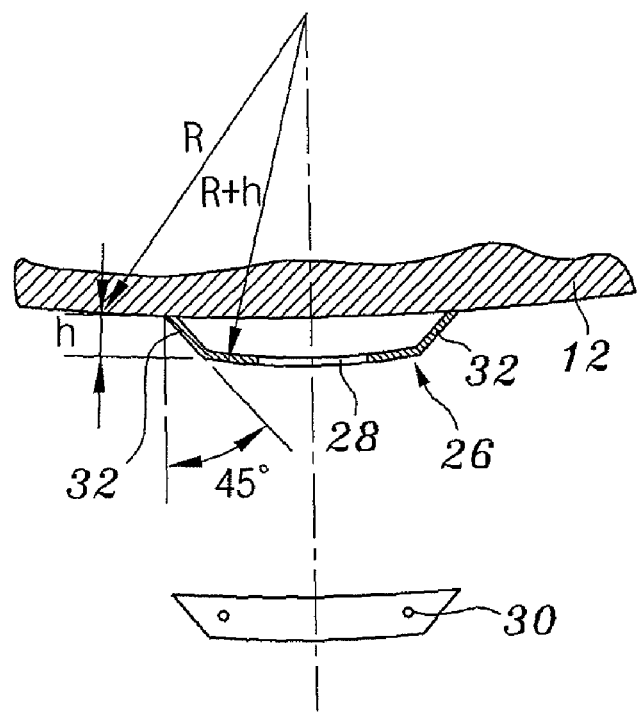
FIGS. 5A and 5B are detailed views illustrating the structure of an injection extension duct according to a first embodiment of the present invention.
Figure 5A:
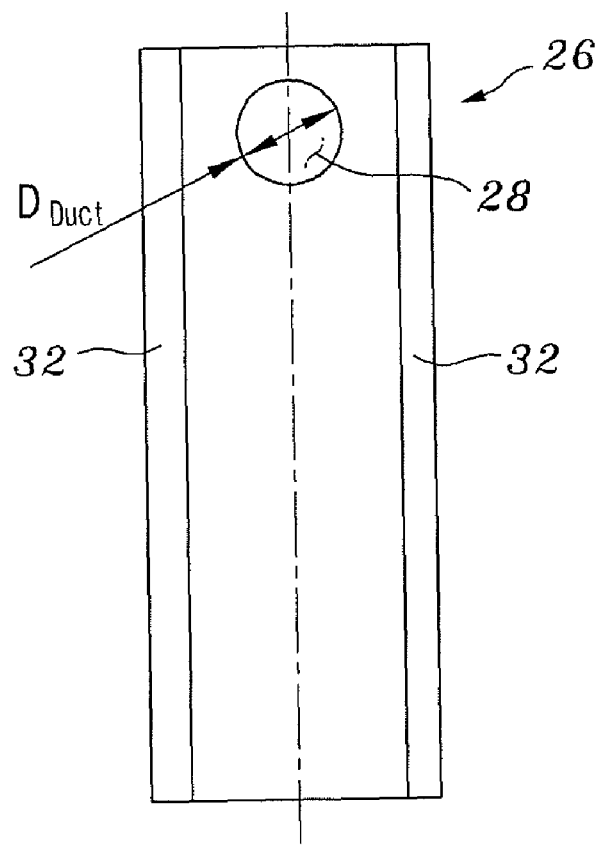

As seen from FIG. 5A, the injection extension duct 26 includes lateral faces 32 inclined in a transverse direction at an angle of about 45° on opposite sides thereof, so that it can reduce the resistance of the cross flow of the downcomer 16 compared to an existing injection extension duct, the lateral faces of which are formed at an angle of 90°.

The injection extension duct 26, which protrudes from the core barrel 12 toward the reactor vessel 10, preferably has a radial distance (h) limited to a range from about 3/25 to about 7/25 of the width of the diametrical gap of the downcomer 16 of FIG. 6. This is because, in the case in which the radial distance (h) must be smaller than the minimum inner diameter $R_{KEY}$ of the upper alignment key portion 34 of the reactor vessel 10 and the inner diameter $R_{HL}$ of the hot leg 22 of FIG. 4A, no interference occurs when the reactor vessel 10 and the core barrel 12 are assembled or when the neutron monitoring capsule is withdrawn.

Thus, as for the cross-sectional shape of the injection extension duct 26 of the present invention, the radius of the curvature of the outer surface of the injection extension duct 26 protruding to the downcomer 16 is equal to the sum of the radius R of the core barrel 12 and the radial distance h of the injection extension duct 26, and the opposite lateral faces of the injection extension duct 26 are similar to the non-parallel opposite sides of an isosceles trapezoid.

Figure 5B:
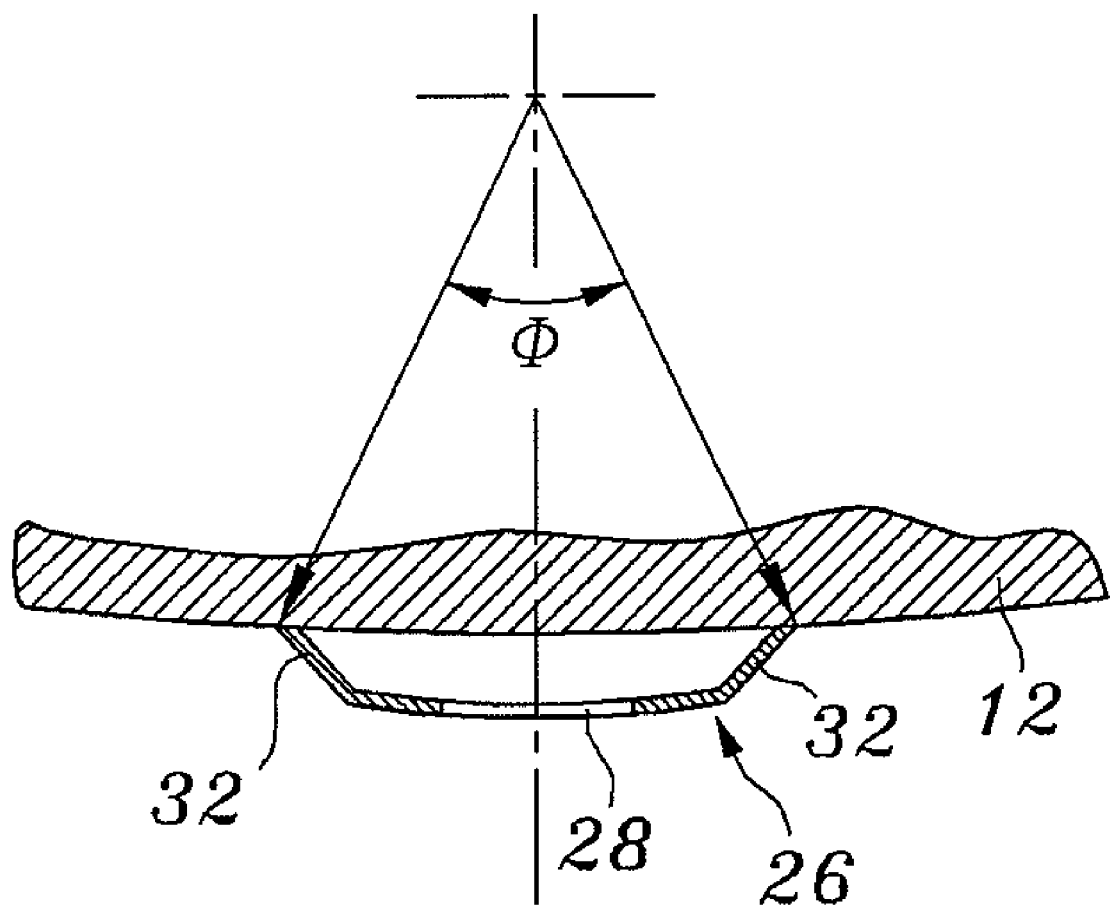

As in FIG. 5B, the injection extension duct 26 of the present invention has a vertical cross-sectional area defined by multiplying the average of the dimensions of the two circumferential parallel faces in the circumferential direction of the core barrel 12 by the radial distance, and is preferably equal to or greater than the effective cross-sectional area of the DVI nozzle 24. Here, considering all of the aforementioned conditions, including the condition that the radial distance h of the injection extension duct 26 be limited to a range from about 3/25 to about 7/25 of the width of the diametrical gap of the downcomer 16, a central angle Φ, subtending the longer circumferential face of the injection extension duct 26 in the circumferential direction of the core barrel 12, appropriately ranges from a minimum of 20° to a maximum of 35°.

The length of the injection extension duct 26 installed on the core barrel 12 starts from the emergency core cooling water intake port 28 facing the DVI nozzle 24 of the reactor vessel 10, and then extends to a lower portion of the downcomer 16 below the positions of the cold leg 20 and the hot leg 22 along the outer surface of the core barrel 12.

Further, the lowest position (length B of FIG. 6) of the outlet of the injection extension duct 26 is within a range from the central axis of the cold leg 20 to a lower portion of the downcomer 16. Considering that the surrounding cooling water is swept out by a strong intake break flow formed in the downcomer 16 around the broken cold leg 20 in the event of a LBLOCA, the lowest position of the outlet of the injection extension duct 26 must exist at a lower portion of the downcomer 16, which is lower than the position of the cold leg 20, and preferably extend toward a lower portion of the downcomer 16 from the central axis of the cold leg 20 within a range from about two to four times the inner diameter $D_{CL}$ of the cold leg, thereby being effective in preventing a direct bypass of the emergency core cooling water.

Although the exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An emergency core cooling system, comprising:
    at least one direct vessel injection nozzle, arranged without protrusion towards a core barrel arranged in a reactor vessel, that injects a jet of emergency core cooling water toward the core barrel arranged in the reactor vessel, wherein the reactor vessel comprises a cooling system having a plurality of cold legs and hot legs installed thereon; and
    at least one injection extension duct arranged on an outer surface of the core barrel facing a corresponding direct vessel injection nozzle, the at least one injection extension duct being mechanically disconnected from the corresponding direct vessel injection nozzle and protruding from the core barrel toward the reactor vessel within a predetermined distance that is less than a hot leg surface defined by a hot leg inner diameter and less than an upper alignment key portion surface defined by a minimum inner diameter of an upper alignment key portion of the reactor vessel, wherein the at least one injection extension duct includes unperforated lateral faces inclined in a transverse direction at an angle of about 45° with reference to an outer surface of the core barrel, at least one air vent configured to permit gas discharge when the reactor vessel is filled with cooling water, and an emergency core cooling water intake port, arranged without protrusion towards the corresponding direct vessel injection nozzle, passing through an outer surface of the at least one injection extension duct, wherein the emergency core cooling water intake port includes a diameter about twice an inner diameter of the corresponding direct vessel injection nozzle and is axially aligned along the corresponding direct vessel injection nozzle such that the jet of emergency core cooling water injected from the corresponding direct vessel injection nozzle flows into the corresponding injection extension duct.

2. The emergency core cooling system as set forth in claim 1, wherein the at least one injection extension duct is open at the lowest portion thereof, and is closed at the highest portion thereof.

3. The emergency core cooling system as set forth in claim 1, wherein the at least one injection extension duct protrudes from the core barrel toward the reactor vessel within a predetermined distance, which ranges from about 3/25 to about 7/25 of the width of a diametrical gap of a downcomer, which is an annular space formed between the reactor vessel and the core barrel.

4. The emergency core cooling system as set forth in claim 1, wherein the at least one injection extension duct installed on the core barrel has a length originating from the emergency core cooling water intake port facing the at least one direct vessel injection nozzle of the reactor vessel, and extending to a lower portion of a downcomer below positions of the plurality of cold legs and hot legs along an outer surface of the core barrel.

5. The emergency core cooling system as set forth in claim 4, wherein the at least one injection extension duct has an outlet, a position of which extends toward the lower portion of the downcomer from a central axis of each cold leg within a range from about two to four times the inner diameter of each cold leg.

* * * * *